(No Model.) 4 Sheets—Sheet 1.

S. KRUEGER.
SPRING MOTOR.

No. 529,074. Patented Nov. 13, 1894.

Witnesses
Robert Soelberger
Jas. N. Fleming

Inventor
Samuel Krueger,
By Drake & Co. Atty's.

(No Model.)  4 Sheets—Sheet 2.

S. KRUEGER.
SPRING MOTOR.

No. 529,074.  Patented Nov. 13, 1894.

Witnesses  Inventor
Robert Sollberger.  Samuel Krueger,
Jas. W. Fleming.  By Drake & Co. Atty's.

(No Model.)

4 Sheets—Sheet 3.

S. KRUEGER.
SPRING MOTOR.

No. 529,074. Patented Nov. 13, 1894.

Witnesses
Robert Soelberger
Jas N. Fleming

Inventor
Samuel Krueger,
By Drake & Co Atty's (No Model.) 4 Sheets—Sheet 4.

S. KRUEGER.
SPRING MOTOR.

No. 529,074. Patented Nov. 13, 1894.

Witnesses
Robert Sollberger
Jas. N. Fleming

Inventor
Samuel Krueger,
By Drake & Co. Atty's.

UNITED STATES PATENT OFFICE.

SAMUEL KRUEGER, OF NEWARK, NEW JERSEY.

SPRING-MOTOR.

SPECIFICATION forming part of Letters Patent No. 529,074, dated November 13, 1894.

Application filed November 6, 1893. Serial No. 490,193. (No model.)

*To all whom it may concern:*

Be it known that I, SAMUEL KRUEGER, a citizen of the United States, residing at Newark, in the county of Essex and State of New Jersey, have invented certain new and useful Improvements in Spring-Motors; and I do hereby declare the following to be a full, clear, and exact description of the invention, such as will enable others skilled in the art to which it appertains to make and use the same, reference being had to accompanying drawings, and to the letters and figures of reference marked thereon, which form a part of this specification.

The object of this invention is to provide a comparatively inexpensive motor for driving light machinery, to control and regulate the distribution of the power and to secure other advantages hereinafter referred to.

The invention consists in the improved spring motor and in the arrangement and combination of the several parts thereof, as herein set forth and finally pointed out in the claims.

Figure 1:
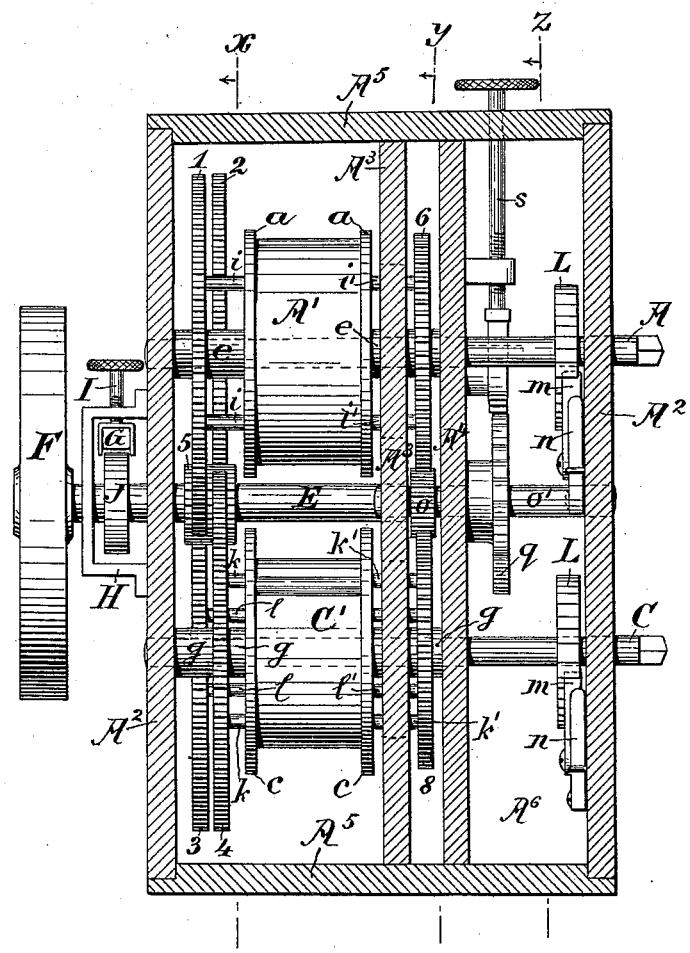
Figure 2:
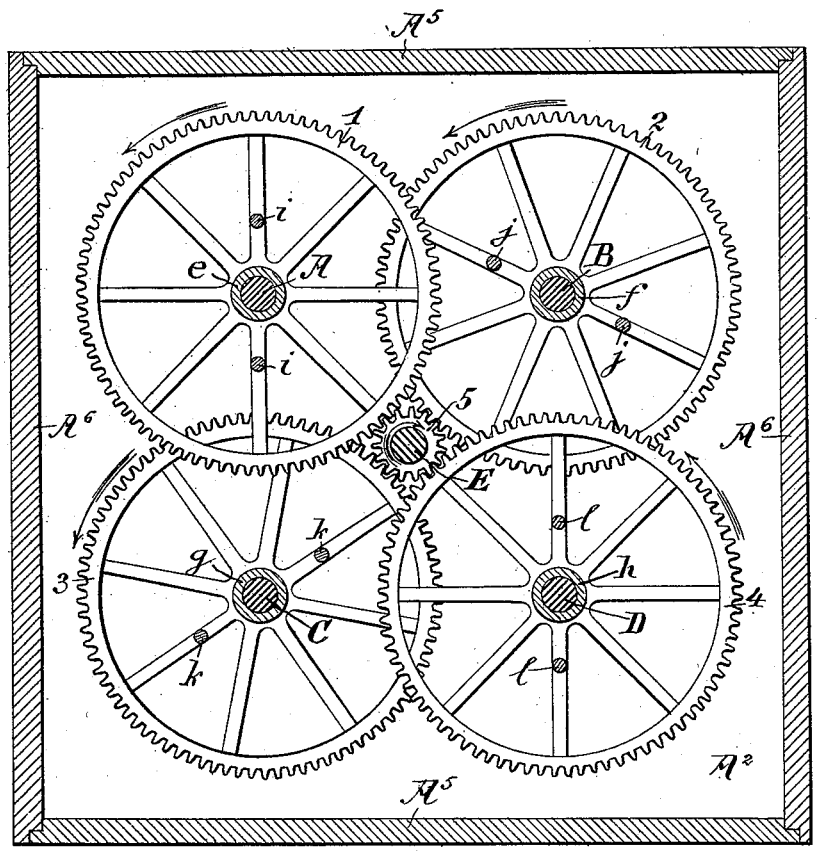
Figure 3:
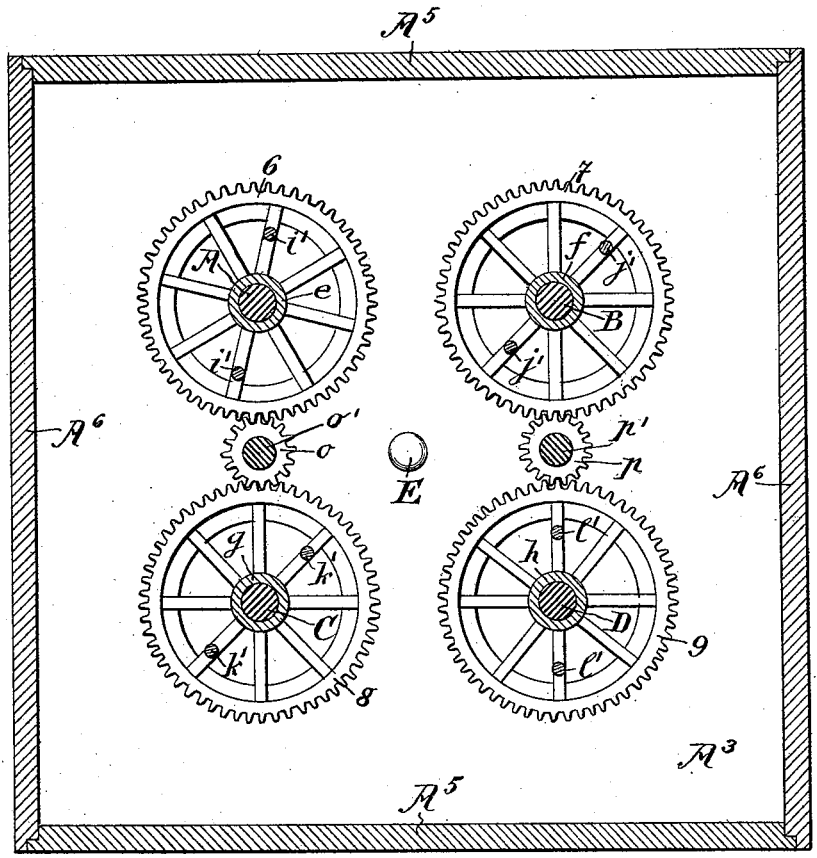
Figure 4:
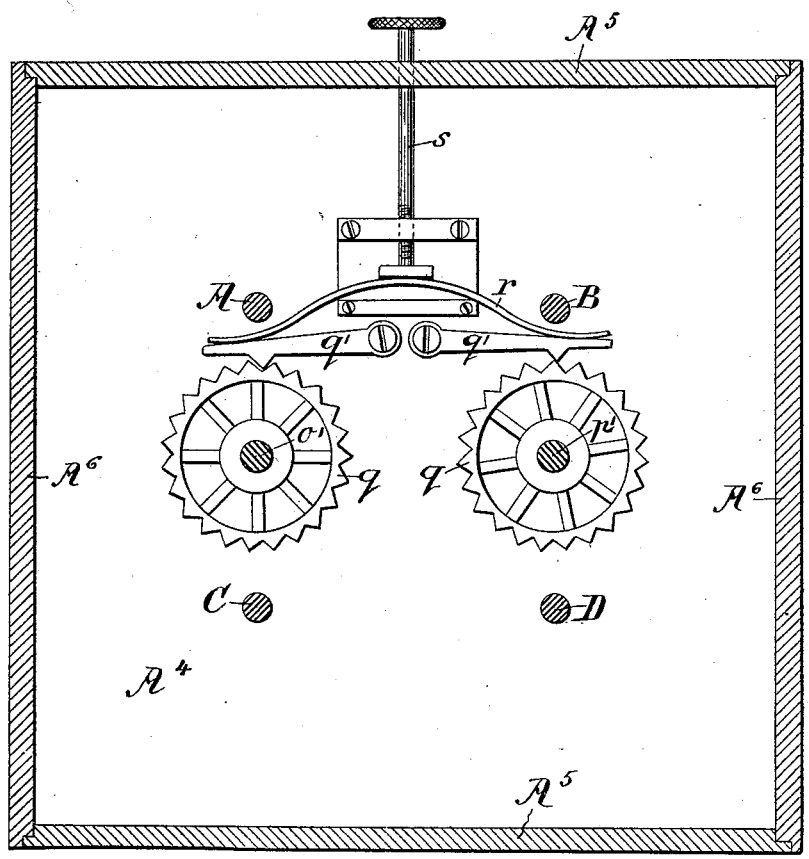

Referring to the accompanying drawings, in which similar letters and figures of reference indicate corresponding parts in each of the several figures where they occur, Figure 1, represents, in plan, a spring motor embodying my improvements, the box or frame thereof being shown in a horizontal section. Fig. 2 is a section taken on the line $x$; Fig. 3, a section on the line $y$, and Fig. 4 a section on the line $z$ of Fig. 1.

In said drawings $A^2$, $A^3$, $A^4$, $A^5$, and $A^6$, designate parts of the box or frame in which the working parts are mounted. The power-springs, four in number, only two of which, $A'$ and $C'$, are shown in the drawings, are firmly secured at their extremities to shafts A, B, C, D, respectively, and to heads, (a portion only of which are shown, $a$ and $c$) which are keyed or otherwise secured to sleeves $e$, $f$, $g$, $h$, carried by and rotating upon said shafts as the springs relax or are being wound up. The power from the springs is transmitted to a driving shaft E, centrally located with respect to the shafts A, B, C, D, by means of gears 1, 2, 3, 4, which engage a pinion 5, carried by said driving shaft, said gears being also carried by said sleeves $e$, $f$, $g$, $h$, and connected with the said heads, adjacent to them, by arms $i$, $j$, $k$, $l$, or the said heads may be enlarged and formed into gears instead of having them separate, as will be readily understood upon reference to Figs. 1 and 2. The power is utilized for other purposes by means of a belt-pulley, F, keyed or secured to said driving shaft E, as indicated in the drawings.

The motor may be stopped when desired by a brake, G, working in a suitable frame H, and operated by a screw I, so as to engage with a wheel, J, keyed to the driving shaft, as indicated in Fig. 1, or by any other appropriate means.

The shafts A, B, C, D, are journaled in boxes or bearings seated in the sides $A^2$ of the frame or box in which the working parts are inclosed, and carry ratchet wheels L which engage pawls $m$, to hold said shafts when the springs are wound up, by means of a crank, (not shown) or are under tension, as will be understood. Said pawls are held in engagement with said ratchets by suitable springs $n$. The center or driving shaft, E, is journaled in portions $A^2$ and $A^3$ of said box or frame or in boxes carried thereby.

The mechanism for regulating the speed or the distribution of power is as follows:— Upon the said sleeves, $e$, $f$, $g$, $h$, are secured gears 6, 7, 8, 9, which also connect with the heads, adjacent to them, by means of arms $i'$, $j'$, $k'$, $l'$, Figs. 1 and 3, or they may be integral with said heads, and engage, in pairs with pinions $o$ and $p$ carried by shafts $o'$ and $p'$, journaled in the parts $A^2$ and $A^3$, as seen in said Figs. 1 and 3. Said shafts $o'$ and $p'$ also carry toothed wheels, $q$, which engage with pawls $q'$, the latter being held in such engagement by a spring $r$, the pressure of which may be increased or diminished by means of a screw $s$, as will be understood upon reference to Figs. 1 and 4. By this arrangement it will be seen that the power exerted by the springs is controlled and regulated by the pressure of the pawls $q'$ upon the ratchet-wheels $q$, said pressure being regulated by the screw $s$. The power may be further regulated by winding up the springs alternately, for example, when the motor is started with all the springs fully wound up and has run, say for one hour or until one quarter of their power is spent, one of the springs may be again fully wound up and in another hour another be wound up, and so on, as will be understood upon reference to Figs. 1, 3, and 4.

Having thus described my invention, what I claim, and wish to secure by Letters Patent, is—

1. In a spring motor, the combination, with a frame, of a series of shafts journaled therein, four of which are each provided with a sleeve and one is provided with a pinion, a spring actuated drum and a pair of gear wheels on each sleeve, one wheel of each of said pairs of wheels being in engagement with said pinion, two of the shafts of said series being provided with pinions in engagement with the other wheels, and means for controlling the movement of each of said two pinions, substantially as set forth.

2. In a spring motor, the combination, with a frame, of a series of shafts journaled therein, four of which are each provided with a pair of spring actuated gear wheels, and one of which is provided with a pinion in mesh with one wheel of each of said pairs of wheels, a pair of the shafts of said series having pinions in engagement with the other gear wheels, each of said pinions being in engagement with two of said gear wheels, and each pinion provided with a toothed wheel, a spring actuated pawl in engagement with each toothed wheel, and means for regulating the pressure of the pawls upon said toothed wheels, substantially as set forth.

3. In a spring motor, the combination, with a frame, of a shaft journaled therein, four spring actuated drums and gear wheels for operating said shaft, a pair of regulators for controlling the drums and gear wheels, each of said regulators being provided with a toothed wheel, a pawl for each toothed wheel, a spring having its end in engagement with said pawl, and a screw for regulating the pressure of said spring and pawls against said wheels, substantially as set forth.

In testimony that I claim the foregoing I have hereunto set my hand this 28th day of October, 1893.

SAMUEL KRUEGER.

Witnesses:
OLIVER DRAKE,
ROBERT SOLLBERGER.